Nov. 4, 1952      C. A. OLCOTT      2,616,669
HEATED MIXING APPARATUS
Filed Feb. 1, 1945
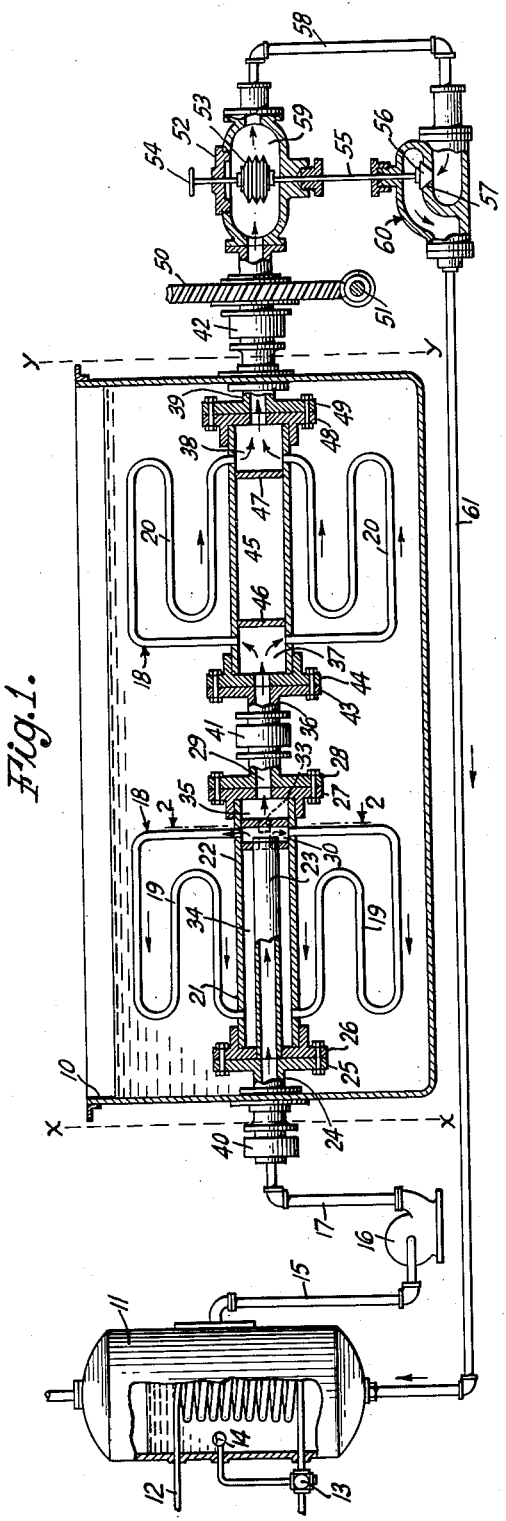
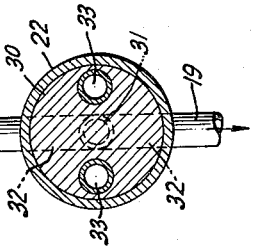
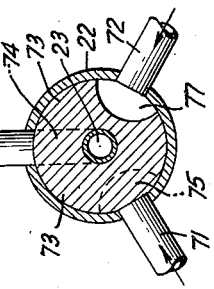
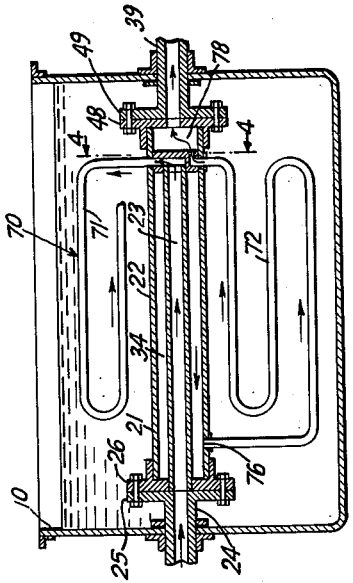
INVENTOR
*CHARLES A. OLCOTT*
BY *Hugh S. Wertz*
ATTORNEY Patented Nov. 4, 1952

2,616,669

UNITED STATES PATENT OFFICE 2,616,669

HEATED MIXING APPARATUS

Charles A. Olcott, West Milford, N. J.

Application February 1, 1945, Serial No. 575,595

3 Claims. (Cl. 257—80)

This invention relates to the temperature conditioning of materials and more particularly to such conditioning of sugar-bearing materials.

It is an object of this invention to provide improved means for heating or cooling sugar-bearing materials.

In Patent No. 2,178,805 issued, November 7, 1939, to Chas. A. Olcott, there is disclosed an arrangement wherein heat is quickly imparted to a mass of magma or other sugar bearing material, prior to the extraction of the sugar therefrom, when a considerable difference in temperature exists between the temperature of the magma and the temperature at which it is desired to introduce the magma into the centrifugal, but more slowly imparted to it when the temperature of the magma approaches that desired and in which overheating of the magma when the desired temperature is attained is prevented. These results are obtained by providing a hot water heater and a pump for circulating water from the heater through a rotating coil and valve, controlled by a thermostat, the valve to operate in response to the temperature of the water leaving the coil. When the magma is relatively cold it cools off the circulating water rapidly, thus lowering its exit temperature. The lowered exit temperature in turn causes the thermostatic valve to open wide, permitting a large amount of hot water to be introduced into the coil, and so impart heat rapidly to the magma. Conversely, when the magma is relatively warm, the exit temperature of the water tends to rise, causing the thermostatic valve to move toward the closed position, thus reducing the volume of the hot water circulated through the coil, and therefore imparting heat to the magma at a reduced rate. When the magma attains a temperature equal to that at which the thermostatic valve is set to close completely, the water at its exit from the coil will then be hot enough to close the thermostatic valve completely, thus shutting off all circulation so that no addition heating of the magma will take place. While this system works satisfactorily in a coil made in one section, as shown, in Patent 2,178,805, the arrangement as shown does not produce even heating if the tanks are so long as to require coils to be made in two sections and supported by a bearing at its center. If the coil is made in two sections, the coil in the section receiving water directly from the heater is relatively hot, and the second section of coil receiving water which has passed through the first section is relatively cool, because the water leaving the first section has already given up some of its heat to the sugar magma. It is an important purpose of this invention to provide means for raising the temperature of the water, which has been cooled by the magma in a first section, so that it will be suitable for heating the magma stirred by a second section of the coil, and thus to insure even heating of the magma in all parts of the tank.

In accordance with the present invention, an improved and more even heat distribution throughout the rotary heating means is obtained by placing means within the coil to reheat the fluid circulating through the coil before it has passed through the entire coil.

In one illustrative embodiment of the invention hot water from a suitable source is passed into the inner one of two concentric pipes forming a rotary heat exchanger which is surrounded by the magma to be heated. The hot water then divides between two closed channels in a casting supporting the inner tube in position, each channel leading to a respective section of the coil adapted to rotate in the magma, and thereafter the two paths come together again and the water flows into the sleeve between the inner and outer tubes, thus reheating the water that has imparted some of its heat to the magma by heat exchange action with the incoming hot water in the inner tube. Outlets from this sleeve permit the water then to flow into a chamber having as parallel outlets two other sections of the coil adapted to rotate in the magma. These latter sections of the coil terminate in a chamber through which the water passes into a thermostat chamber and through a valve controlled thereby to the hot water source. In this arrangement the heat of the water at the start of the latter two sections of the coil is substantially the same as that at the start of the first-mentioned two sections thereof, thus permitting better heat distribution throughout the magma.

In a second embodiment of the invention, only two coil sections or branches adapted to rotate in the magma are provided, the hot water being caused to pass through one of the rotating branches, then be reheated by means of the heat exchanger forming part of the coil, and next be conducted through the other of these two coil sections. The water then passes through the thermostat chamber and the control valve back to the heater. This arrangement has an advantage over the first embodiment in that there are no parallel coil sections between which the water is caused to divide (if one of the parallel sections becomes stopped up, uneven heating is produced).

However, if small pipe is used in the rotating coil branches, a parallel arrangement has the advantage that more hot water can be used for heating.

While the invention has been described in connection with the circulation of water hotter than the magma temperature, it is obvious that, instead, water having a temperature lower than that of the magma can be circulated if it is desired to reduce the magma temperature.

The invention will be more readily understood by referring to the following description taken in connection with the accompanying drawings forming a part thereof, in which:

Fig. 1 shows an arrangement in accordance with the invention for heating magma in a mixer tank used as part of a system for the manufacture of sugar;

Fig. 2 is an enlarged cross-sectional view of a partition in the heating means for the mixer tank shown in Fig. 1 taken through line 2—2 in the latter figure looking in the direction of the arrows;

Fig. 3 shows a modified mixer tank for the arrangement of Fig. 1; and

Fig. 4 is an enlarged cross-sectional view of a partition in the heating means for the mixer tank shown in Fig. 3 taken through line 4—4 looking in the direction of the arrows.

Referring more specifically to the drawing, Fig. 1 shows, by way of example for purposes of illustration, an arrangement for heating magma in a mixer tank 10 forming part of a sugar-manufacturing system. It is to be understood that after the magma in the tank 10 has been temperature-conditioned to the desired temperature, it is conducted to a centrifugal and there acted upon in well-known manner. While this arrangement in accordance with the invention is equally applicable to both heating and cooling the magma, it will be described by way of example in connection with a system wherein the magma is to be raised in temperature. The source 11 of hot water preferably comprises a tank heated by any suitable means such as the coil 12. Steam is passed to the coil 12 through a valve 13 controlled by a thermostatic bulb 14. This bulb controls in a well-known manner the valve 13 to insure that the temperature of the water contained in the tank 11 is maintained at approximately 210 degrees F. but, at any event, more than 190 degrees F. Hot water at this temperature is drawn from the tank 11 through a conduit or pipe 15 by means of the pump 16 and the water is driven by the pump through a pipe or conduit 17 into the rotary heating means or coil 18 in the mixer tank 10. This heating means or coil 18 is in the form of a rotary stirrer and comprises a first pair of coil sections or branches 19 adapted to rotate in the magma, a second pair of rotatable coil sections or branches 20, heat exchanger 21, comprising an outer pipe 22 and an inner pipe 23 coaxial therewith, cooperating with the first pair of branches 19, and passages, to be now described, to and between these various members. The hot water from the source 11 at a temperature above 190 degrees F. enters the inner pipe 23 through a hollow shaft 24 having a flange 25 which is bolted or otherwise secured to a flanged member 26 which acts as a support for one end of each of the inner pipe 23 and the outer pipe 22. The other end of the pipe 22 has a flange thereon or is attached to a flanged member 27 which is bolted or otherwise secured to the flange 28 of the hollow shaft 29. The end of the inner tube 23 remote from the inlet end thereof is supported in a partition or wall member 30 which is shown enlarged and in cross-section in Fig. 2. The member 30 seals one end of the pipe 23 and the annular space 34 between this pipe and the pipe 22. It can be, for example, a casting provided with a passage 31 from the inner pipe 23 to passages 32 leading to each of the coil branches 19, and passages or pipes 33 between the annular space 34 and a chamber 35 leading to the hollow shaft 29 which leads, in turn, to another hollow shaft 36. The latter shaft opens into a chamber 37 which has as parallel outlets the two coil sections or branches 20. The latter branches, as pointed out above, are in contact with the magma in the tank 10 and they terminate in a chamber 38 leading to a hollow shaft 39. Thus water flows successively through hollow shafts 24, pipe 23, passages 32, coil branches 19, annular space 34, openings 33, chamber 35, hollow shafts 29 and 36, chamber 37, coil branches 20, chamber 38 and hollow shaft 39. All of these members are considered parts of the "coil." The hollow shafts 24, 29, 36 and 39 are supported by suitable bearings, and connections to and from these hollow shafts are made by means of rotary joints 40, 41 and 42 respectively. The hollow shaft 36 has a flange 43 which is attached to the flanged member 44 which supports a pipe 45 having partitions 46 and 47 forming, respectively, one end of each of the chambers 37 and 38. The other end of the pipe 45 is supported by flanged member 48 which is secured to the flange 49 of the hollow shaft 39.

The hollow shafts are rotated by a worm wheel 50 and worm gear 51 driven by any suitable source of power (not shown). The hot water in the chamber 38 of the rotary heating means or coil 18 is conducted to a thermostat device 52. The latter can be of the bellows type comprising a metal gas-filled thermostatic bellows 53 which is adjusted by a manually operated wheel 54 passing through the chamber containing the bellows. A valve stem rod 55 is connected to a valve head 56. The expansion and contraction of the bellows 53 operates to raise and lower the valve head 56 in valve 60 to regulate the volumetric flow of the water through the system.

When the valve head 56 is raised out of engagement with its associated valve seat 57, water flows through the system by means of a pipe 58 connecting the chamber 59 of thermostat device 52 with valve 60. When the valve head 56 is closed against seat 57, the flow stops. From the valve 60 the water passes through a pipe 61 to the heater tank 11 where the temperature of the return water is once again brought up to above 190 degrees F.

The operation of the arrangement shown in Fig. 1 will now be described. Assume that the water in the heater tank 11 is brought up to such a temperature that after it has passed through the pipes 15 and 17, the pump 16 and the hollow shaft 24 it is at least 190 degrees F. After passing through the inner pipe 23, the water is then passed through the two coil sections 19 in parallel and by the heat exchange action between these coil sections and the massecuite or magma in the tank 10 (as the coil sections are revolved by means of the gear 50 and worm 51) the temperature of the water in the coil sections 19 as it flows into the annular space 34 is decreased but the temperature of the massecuite or magma is raised because of the heat exchange action between these coil sections and the magma. As the water flows through the annular space 34, its temperature is raised (by heat exchange action between the water in this space and the water in the pipe or tube 23) and in its reheated condition is passed into the coil sections 20 through the parallel passages 33, the chamber 35, the hollow shafts 29 and 36 and the chamber 37. By the heat exchange action between the rotating coil sections 20 and the magma in the tank 10, the temperature of the water (as it flows into the chamber 38) has been lowered to about 140 degrees F., for example, but at any event is less than 170 degrees F. Assuming that the thermostat bellows 53 is already in the position corresponding to 140 degrees F., for example, the valve head 56 is not moved and the water passes through the pipe 58, valve 60, and pipe 61 to the heater tank 11 without change in the impedance of this circuit. However, in the event that the magma in the tank 10 remains therein for a longer period than that for which the apparatus is adjusted, such, for example, as the result of the stopping of the centrifugal machines, the rate at which heat energy must be supplied to the magma to maintain it at the desired temperature is substantially less than that required to effect rapid heating, for only as much heat is needed as will offset heat loss from the magma by radiation or otherwise. If, nevertheless, the water entering the coil sections 19 and the coil sections 20 continued at the same volume, it is obvious that the magma would be dangerously overheated. However, the higher the magma temperature, the smaller is the temperature differential between the heating water and the magma, and the lower the rate at which heat is extracted from the water passing through the coil sections 19 and 20. In consequence of any reduction in the rate of extraction of heat from the coils, the temperature of the water leaving the coil 18 tends to rise. In this situation, the thermostat 52 operates the valve 60 in such direction as to increase the impedance presented to the circulation of water by the pump 16 and thereby to reduce the velocity of flow, the volume of hot water entering the coil, and the amount of heat imparted to the magma by the coil. If the magma remains in the tank 10 a shorter than normal period of time, the reverse of the above analysis is true and the valve 60 is operated to decrease the impedance of the circuit and thus to increase the velocity of flow, thereby increasing the volume of the fluid supplied to the inlet of the coil 18. This action has the effect of heating the magma more slowly when it is near the desired temperature and faster when it is much less than this temperature and also of preventing overheating of the magma when the desired temperature is attained.

The system described above is equally applicable to attaining a desired temperature in sugar-bearing materials or other masses. For example, magma or massecuite can in this manner be raised to a uniform temperature in a crystallizer employed in the processing of sugar. In addition, the apparatus in accordance with this invention can be used for reducing the temperature of a mass below the ambient and maintaining the mass at that desired temperature.

In arrangements where water is caused to divide between two coil sections in parallel, the stoppage of one of the sections causes an unbalanced heating (or cooling). Such a stoppage may be caused by rust when steel pipes are used. In the arrangement of Fig. 3, there are no coil branches connected in parallel. In this latter arrangement, the rotating apparatus within the tank 10 is different from that shown in Fig. 1 but in all other respects the system is the same. Thus only the tank 10 and the apparatus therein has been shown. In the rotary stirring means or coil 70 of Fig. 3, two coil sections 71 and 72 have been provided instead of the two sets of coil sections 19 and 20 of the arrangement of Fig. 1. The hot water is adapted to pass first through coil section 71 and then through section 72. The hollow shafts 24 and 39, flanges 25, 26, 48 and 49 and pipes 22 and 23 having an annular space 34 therebetween are similar to the correspondingly numbered elements in the arrangement of Fig. 1. The partition 30 has, however, been replaced by the partition 73 shown in cross-section in Fig. 4. It is obvious that many of the elements inside the tank 10 in Fig. 1 are not necessary in the arrangement of Fig. 3 since more coil sections are shown in Fig. 1.

The arrangement of Fig. 3 operates in the following manner: Hot water having a temperature, for example, of above 190 degrees F. is applied to the hollow shaft 24 as in the arrangement of Fig. 1 and is conducted through the inner pipe 23. The water then passes through the channel 74 in the partition 73 to coil section 71. The water from coil 71 enters the annular space 34 at passage 75. The water in this annular space 34 is increased in temperature due to the heat exchange action with the water in the pipe 23 before it exits through the opening 76 into the coil section 72 where its temperature is lowered due to the heat exchange action with the magma. The water is then conducted through the passage 77 into the chamber 78 which opens into the hollow shaft 39. The water at this point is at a temperature which is less than 170 degrees and may be, for example, at 140 degrees F. The water flows from the hollow shaft 39 into the other elements of the system shown in Fig. 1. Except for the differences above mentioned, the operation of the system in which the arrangement of Fig. 3 is substituted for the portion between the lines X—X and Y—Y of Fig. 1 is similar to that of the system of Fig. 1.

If desired, different combinations of the various ways of connecting coil sections shown in Figs. 1 and 3 can be utilized. Moreover, the inner pipe 23 shown as a plain pipe in Figs. 1 and 3 can be made in the form of a coil, or its surface can be equipped with fins, in a manner well known and widely used in the design and construction of heat exchangers.

Although the present invention has been described in terms of preferred illustrative embodiments, it should be realized that the invention and its several features are susceptible of embodiment in a wide variety of other forms and hence the invention is to be understood as comprehending such other forms as may fairly come within the spirit and letter of the appended claims. For example, coil sections of the general form shown in Patent 1,934,006 issued November 7, 1933, to W. A. Rolston, can be used in place of those shown in the drawing, if desired.

What is claimed is:

1. A rotary stirring means or coil for the temperature conditioning of certain liquid materials comprising two coaxially arranged rotating tubes in heat exchange relation with each other, means for admitting to the inner one of said tubes a fluid adapted to bring said liquid material to a desired temperature, and a hollow coiled pipe arrangement in heat exchange relation with said liquid material and positioned to rotate with said tubes and through which liquid flows from said inner tube to said outer tube, said coiled pipe arrangement comprising two stirring coil sections between which the fluid divides and each of which is connected between a point adjacent the end of said inner tube remote from the entrance for the fluid and a point adjacent the end of said outer tube near the said entrance for the fluid and another stirring coil section connected by passage means to the end of said outer tube remote from the entrance for the fluid, said two coaxially arranged tubes having sufficient surface area thereof in heat exchange relation with each other to make the temperature of the fluid at the entrance of said last-mentioned stirring coil section substantially the same as that at the entrance of said first-mentioned two stirring coil sections.

2. A rotary stirring means for the temperature conditioning of certain liquid materials comprising two coaxially arranged rotating tubes in heat exchange relation with each other, means for admitting to the inner one of said tubes a fluid adapted to bring said liquid material to a desired temperature, and a hollow coiled pipe arrangement in heat exchange relation with said liquid material and positioned to rotate with said tubes and through which liquid flows from said inner tube to said outer tube, said coiled pipe arrangement comprising two stirring coil sections between which the fluid divides and each of which is connected between a point adjacent the end of said inner tube remote from the entrance for the fluid and a point adjacent the end of said outer tube near the said entrance for the fluid, and two other stirring coil sections between which the fluid divides after it has passed through said first two stirring coil sections and connected by passage means to the end of said outer tube remote from the entrance for the fluid, said two coaxially arranged tubes having sufficient surface area thereof in heat exchange relation with each other to make the temperature of the fluid at the entrance of said two other stirring coil sections substantially the same as that at the entrance of said first-mentioned two stirring coil sections.

3. A rotary stirring means or coil for the temperature conditioning of a liquid material comprising a plurality of hollow coil sections through which, in turn, fluid to vary the temperature of said liquid material is passed and which are adapted to turn about a horizontal axis in said liquid material within two end bearings and a central bearing, one of said coil sections comprising a hollow passage member for the introduction of said fluid to the remainder of said coil and being positioned about said axis and extending along it for the major portion of the distance between one of said end bearings and the central bearing, a second of said coil sections being connected to said first section at a point thereof adjacent its end near the central bearing and comprising a first stirring member having a plurality of bends therein adapted to be rotated in said liquid, a third of said coil sections being connected to said first stirring member at a point near the fluid entrance end of said passage member and comprising a hollow member coaxial with the passage member and in heat exchange relationship therewith for raising the temperature of the fluid at the end of said third coil section to substantially that at the beginning of said second coil section, a fourth of said coil sections comprising a passage member connected to said third coil section and extending through said central bearing, and a fifth of said coil sections comprising a second stirring member connected to said fourth coil section and having a plurality of bends therein and being adapted to be rotated in said liquid like said first stirring member but about the portion of said axis between the central bearing and the other of said end bearings.

CHARLES A. OLCOTT.

REFERENCES CITED

The following references are of record in the file of this patent:

UNITED STATES PATENTS

| Number | Name | Date |
|---|---|---|
| 736,875 | Ragot et al. | Aug. 18, 1903 |
| 1,934,006 | Rolston | Nov. 7, 1933 |
| 1,948,280 | Schildman | Feb. 20, 1934 |
| 1,951,996 | Schaefer | Mar. 20, 1934 |
| 2,254,386 | Olcott | Sept. 2, 1941 |
| 2,271,862 | Hodgdon | Feb. 3, 1942 |